(12) United States Patent
Garnault et al.

(10) Patent No.: US 10,829,120 B2
(45) Date of Patent: Nov. 10, 2020

(54) PROACTIVE SAFE DRIVING FOR AN AUTOMATED VEHICLE

(71) Applicant: Valeo Schalter und Sensoren GmbH, Bietigheim-Bissingen (DE)

(72) Inventors: Alexandre Jacques Garnault, San Francisco, CA (US); Tung Ngoc Truong, San Jose, CA (US)

(73) Assignee: Valeo Schalter und Sensoren GmbH (DE)

(*) Notice: Subject to any disclaimer, the term of this patent is extended or adjusted under 35 U.S.C. 154(b) by 220 days.

(21) Appl. No.: 16/011,540

(22) Filed: Jun. 18, 2018

(65) Prior Publication Data

US 2019/0382018 A1 Dec. 19, 2019

(51) Int. Cl.
*B60W 30/18* (2012.01)
*B60W 30/09* (2012.01)
*B60W 30/095* (2012.01)

(52) U.S. Cl.
CPC ...... *B60W 30/18163* (2013.01); *B60W 30/09* (2013.01); *B60W 30/0956* (2013.01); *B60W 2520/10* (2013.01); *B60W 2554/4041* (2020.02); *B60W 2554/804* (2020.02); *B60W 2556/45* (2020.02); *B60W 2720/10* (2013.01)

(58) Field of Classification Search
None
See application file for complete search history.

(56) References Cited

U.S. PATENT DOCUMENTS

| | | | | |
|---|---|---|---|---|
| 2009/0088925 A1* | 4/2009 | Sugawara | ............. | B60W 30/12 701/41 |
| 2017/0018189 A1* | 1/2017 | Ishikawa | ............. | G05D 1/0088 |
| 2018/0251129 A1* | 9/2018 | Ji | ............. | B60W 30/18163 |
| 2019/0016339 A1* | 1/2019 | Ishioka | ............. | G05D 1/0223 |
| 2019/0023273 A1* | 1/2019 | Ishioka | ............. | B60W 30/10 |

* cited by examiner

*Primary Examiner* — Jonathan M Dager
*Assistant Examiner* — Garrett F Evans
(74) *Attorney, Agent, or Firm* — Weaver Austin Villeneuve & Sampson LLP

(57) ABSTRACT

A method and corresponding apparatus involve monitoring, by a first motor vehicle, a position of a second motor vehicle in an adjacent lane and performing an automated safety routine. The safety routine includes determining, based on sensor data, whether the vehicles are maintaining a same speed and determining whether the first motor vehicle can switch to the adjacent lane without colliding with the second motor vehicle. If the vehicles are maintaining the same speed and the first motor vehicle cannot switch to the adjacent lane, a longitudinal offset is set based on the sensor data and established by automatically decreasing the speed of the first motor vehicle. The speed of the first motor vehicle is automatically adjusted to maintain at least the longitudinal offset until the first motor vehicle can switch to the adjacent lane without colliding with the second motor vehicle.

20 Claims, 10 Drawing Sheets

PROACTIVE SAFE DRIVING FOR AN AUTOMATED VEHICLE

BACKGROUND OF THE INVENTION

A dangerous situation occurs when vehicles drive close to each other in adjacent lanes, e.g., side-by-side at high speed. Not only does this create a risk of collision between the adjacent vehicles, it is also a source of stress for vehicle occupants. It is therefore desirable to avoid driving alongside another vehicle.

SUMMARY OF INVENTION

The present disclosure relates to techniques for performing an automated safety routine based on monitoring of vehicles in adjacent lanes. One aspect of the present disclosure relates to setting a longitudinal offset between an automated vehicle and a vehicle in an adjacent lane so that the automated vehicle has at least one lane change maneuver available in case a lane change is needed. The longitudinal offset can be established by, for example, automatically decreasing the speed of the automated vehicle. Another aspect of the present disclosure relates to determining when to enable or disable a safety routine that establishes a longitudinal offset. Depending on various conditions such as the level of automation the vehicle is operating under, the degree of traffic congestion around the vehicle, and the relative speeds of both vehicles, the establishing of longitudinal offsets can be prevented for certain situations indicated by those conditions. The safety routine can, for example, be disabled when the conditions indicate that establishing a longitudinal offset is unhelpful.

Unlike manual driving, automated vehicles can take advantage of additional types of data that are not available to a human driver. This additional data can be applied to monitor the position, speed, acceleration, and other attributes of vehicles in adjacent lanes in order to proactively move an automated vehicle into a safe position with respect to an adjacent vehicle. In some embodiments, the position of the automated vehicle is optimized with respect to multiple adjacent vehicles, with an objective of making at least one lane change maneuver available to the automated vehicle. In this manner, the automated vehicle can avoid dangerous driving situations, such as driving side-by-side with another vehicle while both vehicles at high speeds, while also ensuring the ability to perform a lane change if needed. Thus, an automated driving maneuver in accordance with an embodiment of the present disclosure can be based on calculations that can use sensor data from multiple directions around the vehicle to, for example, place the vehicle in a predetermined position with respect to one or more vehicles in an adjacent lane.

Example embodiments are directed to a method performed by a processor of a computer in a first motor vehicle. The method includes detecting, monitoring, by a processor of a computer in a first motor vehicle, a position of a second motor vehicle in an adjacent lane; and performing an automated safety routine. The safety routine includes determining, by the processor and based on sensor data indicating positions and speeds of the first motor vehicle and the second motor vehicle, whether the first motor vehicle and the second motor vehicle are maintaining a same speed. The safety routine further includes determining, by the processor and based on the sensor data, whether the first motor vehicle can switch to the adjacent lane without colliding with the second motor vehicle. The safety routine further includes responsive to determining that the first motor vehicle and the second motor vehicle are maintaining the same speed and that the first motor vehicle cannot switch to the adjacent lane without colliding with the second motor vehicle, setting a longitudinal offset between the first motor vehicle the second motor vehicle based on the sensor data and establishing the longitudinal offset by automatically decreasing the speed of the first motor vehicle, and automatically adjusting the speed of the first motor vehicle to maintain at least the longitudinal offset until the processor determines that the first motor vehicle can switch to the adjacent lane without colliding with the second motor vehicle.

Example embodiments are directed to an automated driving apparatus include a control circuit in a first motor vehicle. The control circuit is operable to monitor a position of a second motor vehicle in an adjacent lane and perform an automated safety routine. The safety routine includes determining, based on sensor data indicating positions and speeds of the first motor vehicle and the second motor vehicle, whether the first motor vehicle and the second motor vehicle are maintaining a same speed. The safety routine further includes determining, based on the sensor data, whether the first motor vehicle can switch to the adjacent lane without colliding with the second motor vehicle. The safety routine further includes responsive to determining that the first motor vehicle and the second motor vehicle are maintaining the same speed and that the first motor vehicle cannot switch to the adjacent lane without colliding with the second motor vehicle, setting a longitudinal offset between the first motor vehicle the second motor vehicle based on the sensor data and establishing the longitudinal offset by automatically decreasing the speed of the first motor vehicle, and automatically adjusting the speed of the first motor vehicle to maintain at least the longitudinal offset until the first motor vehicle can switch to the adjacent lane without colliding with the second motor vehicle.

DETAILED DESCRIPTION OF THE INVENTION

Figure 1:
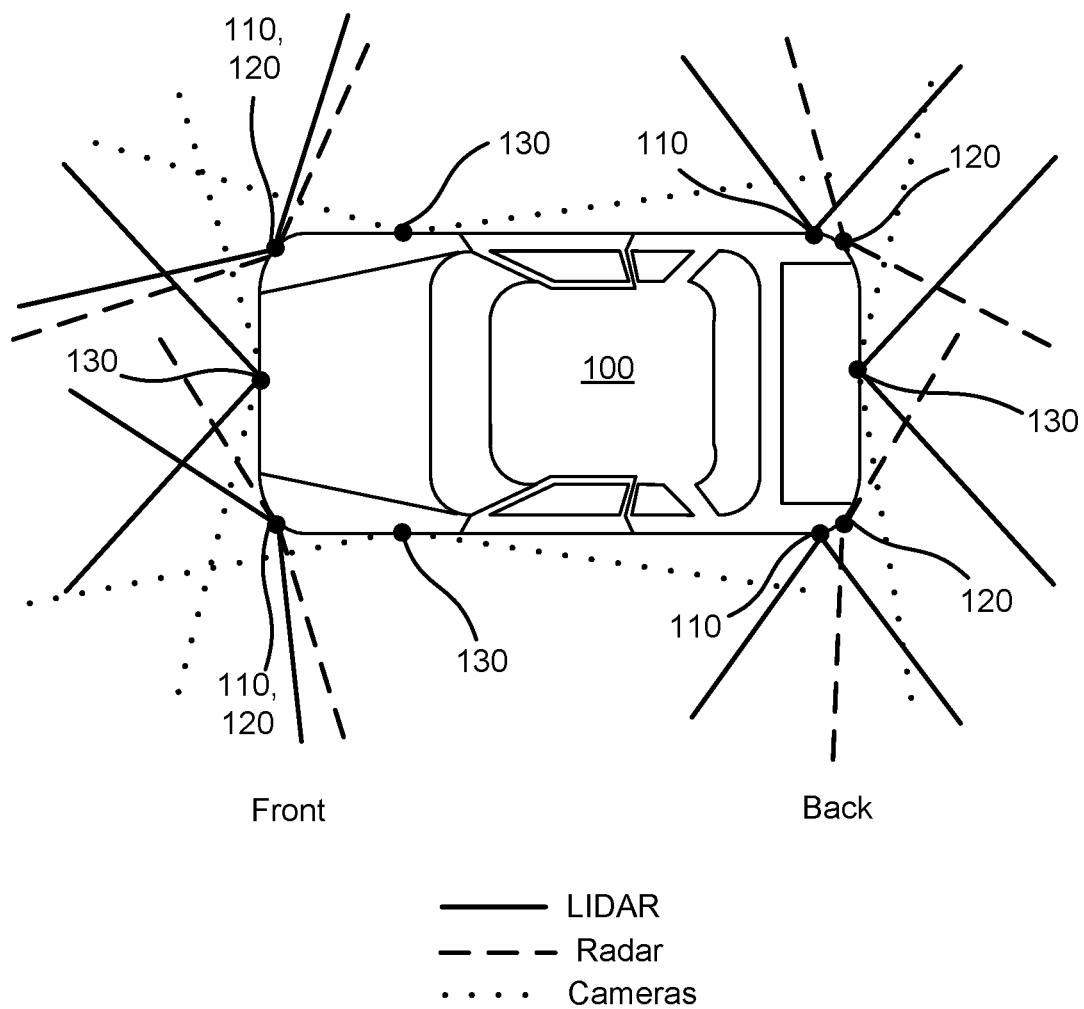
FIG. 1 illustrates coverage areas of a variety of vehicle sensors, for automated operation in connection with certain aspects of the present disclosure.

The present disclosure relates to techniques for maintaining a safe distance to an adjacent vehicle while operating in an automated driving mode, in order to be able to take proper action if an emergency situation happens. The techniques described herein can be implemented in any vehicle equipped with a sensor suite capable of detecting various conditions described herein. The present disclosure makes reference to certain types of sensors, including radar sensors, Light Detection and Ranging (LIDAR) sensors, global positioning system (GPS) sensors, ultrasonic sensors, and cameras. However, it will be understood that as newer sensor technologies develop, such new sensors could be applied to the techniques described herein. The techniques are implemented on a vehicle with automated driving capabilities; this vehicle is referred to herein as an "ego vehicle," or "automated vehicle" interchangeably. A vehicle with autonomous driving capabilities may also be referred to as a self-driving car, self-driving vehicle, autonomous vehicle, and the like. An automated vehicle may include an advanced driver assistance system (ADAS), such as an automated cruise control (ACC) system, a lane change assistance system, a blind spot detection system, a parking assistance system or any other type of automated system.

The embodiments described in the present disclosure may be used in vehicles that offer various degrees of automated driving capabilities, ranging from partial driver assistance to full automation of all aspects of the driving task. The National Highway Traffic Safety Administration (NHTSA) and Society of Automotive Engineers (SAE) International define levels of vehicle autonomy as follows:

Level 0, where the driver is in full control of the vehicle;

Level 1, where a driver assistance system controls steering or acceleration/deceleration;

Level 2, where the driver assistance system controls steering and acceleration/deceleration, and where the driver performs all other aspects of the driving task;

Level 3, where all aspects of driving are performed by the driver assistance system, but where the driver may have to intervene if special circumstances occur that the automated vehicle is unable to safely handle;

Level 4, where all aspects of driving are performed by the driver assistance system, even in situations where the driver does not appropriately respond when requested to intervene; and Level 5, where the vehicle drives fully autonomously in all driving situations, with or without a passenger.

It should be noted that the term "autonomous vehicle" is sometimes used in the art to refer to any level of automation. However, in this document, "automated vehicle" is used to refer to level 1 through level 3 of automation, for when the driver assistance system controls at least some aspects of driving, but some input from a human driver can still be expected, and the term "autonomous vehicle" is used to refer to levels 4 and 5 of automation, for when there is little or no intervention by a human driver. To distinguish from manual driving, the term "automated driving mode" is used herein to refer to a vehicle operating under any of levels 1 through 5. Thus, a vehicle operating in an automated driving mode can be an automated vehicle or an autonomous vehicle. Example embodiments are described with respect to an automated vehicle. However, it will be understood that the embodiments may equally apply to an autonomous vehicle.

One aspect of the present disclosure relates to performing an automated safety routine in which an automated vehicle establishes and maintains at least a certain distance to at least one vehicle in an adjacent lane. When vehicles travel closely together in adjacent lanes (e.g., side-by-side), especially at high speeds, there is a higher risk of collision because it is not possible to change into the lane of the adjacent vehicle without colliding with the adjacent vehicle. Additionally, one of the vehicles may be in the blind spot of the other vehicle. This is especially dangerous if both vehicles maintain the same speed because the driver with the blind spot remains unaware of the presence of the adjacent vehicle. Automated vehicles can usually detect the presence of an adjacent vehicle in the automated vehicle's blind spot using sensors, but blind spots are still a concern for manually operated vehicles. Therefore it should not be assumed that the adjacent vehicle is aware of when the automated vehicle is in the adjacent vehicle's blind spot.

The distance to be maintained can be specified as a longitudinal offset determined by a control unit of the automated vehicle based on sensor data. The sensor data is processed to determine how the automated vehicle is situated in relation to neighboring vehicles (including any adjacent vehicles) and includes, for example, speed information and position information. The value of the longitudinal offset can be computed to provide the automated vehicle with sufficient room to maneuver into an adjacent lane in which another vehicle is currently located, should the automated vehicle encounter an emergency that requires such a maneuver. Preferably, the longitudinal offset is large enough that there is no longitudinal overlap between the automated vehicle and the adjacent vehicle. Additionally, the longitudinal offset can be set large enough to ensure that the automated vehicle moves out of the adjacent vehicle's blind spot. The risk of colliding with the adjacent vehicle is thereby minimized. The longitudinal offset can also contribute to the comfort of the occupants of the automated vehicle by reducing the stress associated with perceived dangerous situations, in particular the situation of driving side-by-side with another vehicle.

Another aspect of the present disclosure relates to determining when to enable a safety routine that establishes a longitudinal offset to an adjacent vehicle. In one embodiment, the safety routine is enabled only when certain conditions are met. One of these conditions is that the automated vehicle is not currently in a traffic congestion situation, e.g., when traffic is slow moving and vehicles are spaced closely together. In a traffic congestion situation, a longitudinal offset may not be established because evasive maneuvers are unlikely to be performed. Further, a longitudinal offset can be counterproductive in a traffic congestion situation because other drivers are likely to seek to move into a space created by the automated vehicle. Another condition for enabling the safety routine is when neighboring vehicles are not densely packed. Unlike traffic congestion, high vehicle density does not necessarily involve slow speeds. However, a vehicle dense situation is similar in that establishing a longitudinal offset may be counterproductive or may not be possible given the close spacing between vehicles.

FIG. 1 shows an automated vehicle 100 equipped with a plurality of sensors, including LIDAR sensors 110, radar sensors 120, and cameras 130. In addition to these sensors, other types of sensors suitable for use with the techniques described include GPS sensors, infrared sensors, microphones, and ultrasonic sensors. Each of the sensors 110, 120, and 130 has a corresponding coverage area, shown in FIG. 1 as an angular field of view. The coverage areas are not drawn to scale and may, for example, extend at different angles or ranges than those depicted. Instead, FIG. 1 is to illustrate that with appropriate placement of the sensors, a variety of data can be gathered in all directions along a perimeter of the automated vehicle 100 for 360 degrees of coverage. Additionally, FIG. 1 illustrates the principle of redundant coverage, as seen from the overlapping coverage areas. This is important because certain types of sensors are better suited than others for detecting certain conditions. For example, a LIDAR sensor may be used to detect distance to another object better than a camera, but cameras are sometimes better suited for detecting the presence of vehicles obstructed by other vehicles. As another example, radar has a longer range and can easily operate at night or in cloudy conditions, but LIDAR can detect smaller objects and at a higher resolution compared to radar. Redundancy also permits continuous coverage when a sensor malfunctions.

Figure 2:
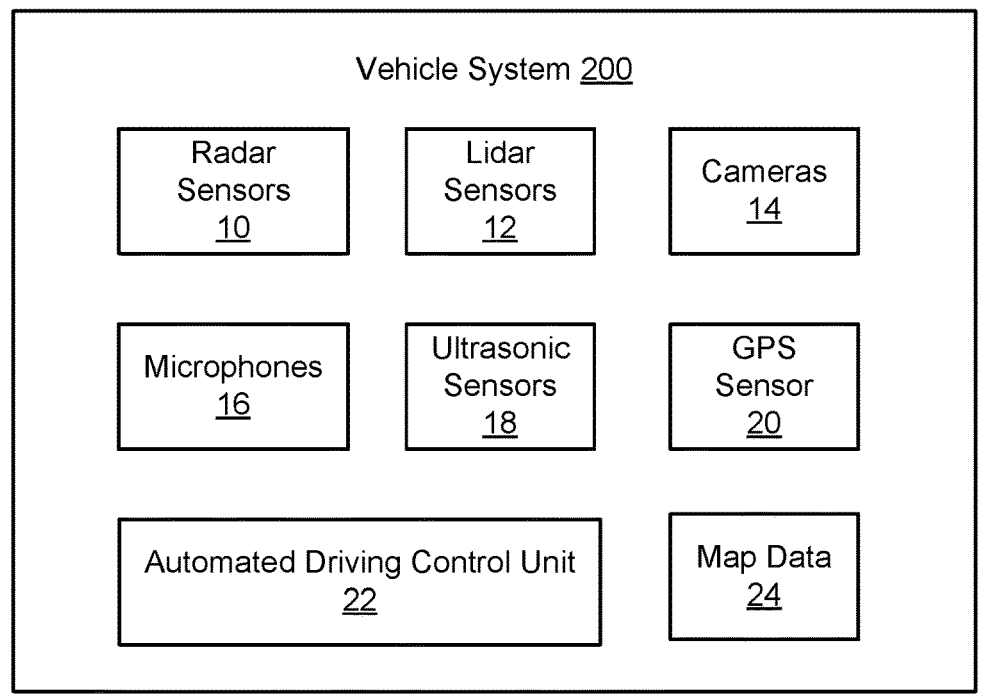
FIG. 2 is a block diagram of various vehicle components, according to certain aspects of the present disclosure.

FIG. 2 is a block diagram of a vehicle system 200. The system includes a sensor suite comprising radar sensors 10, LIDAR sensors 12, cameras 14, microphones 16, ultrasonic sensors 18, a GPS sensor 20, an automated driving control unit 22, and map data 24. The radar sensors 10, the LIDAR sensors 12, and the cameras 14 can be mounted in various locations throughout the vehicle. For example, the sensors may be positioned as shown in FIG. 1, with a radar sensor and a LIDAR sensor at each of the four corners of the vehicle, a front facing camera, a rear facing camera, and a pair of cameras near the driver and front passenger doors. The microphones 16 operate to detect sounds from the external environment including, for example, detecting an activation of another vehicle's horn and a direction from which the horn sound originates. In some implementations, at least one of the microphones 16 operate to detect internal sounds for diagnosis of problems such as engine knocking. The ultrasonic sensors 18 may be used during parking maneuvers of a vehicle to identify distances from objects in a vicinity of the vehicle based on a timing of ultrasonic waves reflected from the objects and notify the driver of objects that are very close to the vehicle (e.g., closer than a certain threshold distance).

The GPS sensor 20 can be used to track a position of the automated vehicle through communication with satellites. The GPS sensor 20 may operate in conjunction with an electronic map to provide real time tracking of the automated vehicle's position with respect to a geographical area of the electronic map. The electronic map can be stored locally for use with an onboard vehicle navigation system, e.g., stored as part of the map data 24. In some implementations, the map data 24 is updated using information transmitted to the automated vehicle by an external communications system such as a traffic monitoring station. Map updates can be triggered manually or automatically, for example at specified time intervals or when the automated vehicle enters a geographical area not described by the map data 24.

The automated driving control unit 22 controls vehicle operations while the vehicle is operating in an automated driving mode, for example, operating as an automated vehicle, and may include one or more processors. The processors can be implemented with one or more general purpose computer processors that execute software instructions stored on a non-transitory computer readable storage medium such as flash memory, a hard disk, a solid state drive, etc. Such processors may, in addition to performing automated control, also operate to control other aspects of the vehicle such as climate control, entertainment, or navigation. Alternatively, the processors can be implemented with a field-programmable array, application-specific integrated circuits, or other processing hardware dedicated to automated control.

Figure 3:
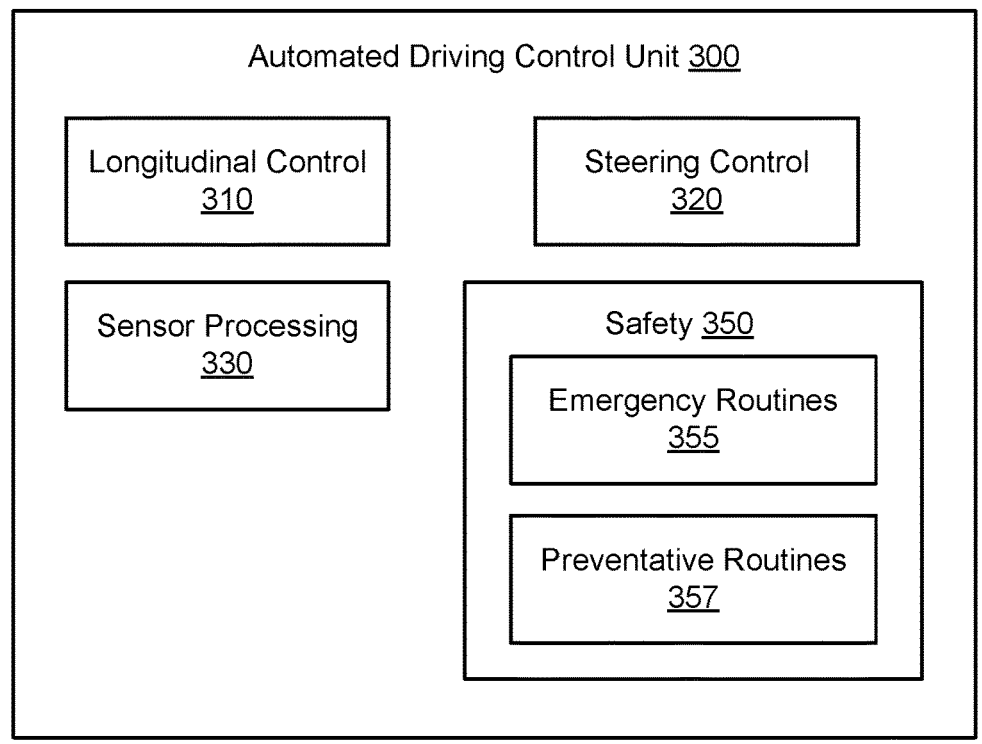
FIG. 3 is a block diagram of an automated driving control unit, according to certain aspects of the present disclosure.

FIG. 3 shows an automated driving control unit 300, which can be implemented in hardware (e.g., as a control circuit), software, or a combination of both. For example, the automated driving control unit 300 may comprise software code executed by a processor that performs other vehicle functions such as navigation. Alternatively, the automated driving control unit 300 may comprise dedicated circuitry or hardware. The automated driving control unit 300 includes a longitudinal control module 310, a steering control module 320, a sensor processing module 330, and a safety module 350. The longitudinal control module 310 sets longitudinal control parameters for the automated vehicle. The longitudinal control parameters can include an acceleration amount, a deceleration or braking amount, a target speed, and other parameters that govern longitudinal motion.

The steering control module 320 sets lateral control parameters for the vehicle and may implement routines for steering maneuvers, such as fine steering adjustments for lane keeping and coarse steering adjustments for lane changes and turns.

The sensor processing module 330 collects and processes data from the sensor suite. The sensor processing module 330 may analyze the collected data through one or more fusion processes. Fusion refers to a process by which data from multiple sensors of the same type or different types are combined to determine something which could not otherwise be determined by one sensor alone, thereby correcting for the deficiencies of any individual sensor. For example, in FIG. 1 data captured by the radar sensors 120 positioned at the front corners of vehicle 100 could be fused to form a more complete description of the surroundings in front of the vehicle. The data of the front facing radar sensors 120 could also be fused with data of the front facing LIDAR sensors 110 to form an even more complete description of the surroundings in front of the vehicle. A variety of fusion techniques exist which would be suitable for use with the embodiments described herein. One of ordinary skill would readily be able to select from these fusion techniques given the objectives described.

The safety module 350 operates to perform various safety measures, including measures performed in response to emergencies such as imminent collisions. Emergency measures include, for example, swerving to avoid a collision with an on-coming obstacle, braking to stop the automated vehicle from reaching an on-coming obstacle, and other evasive maneuvers. These emergency measures can be implemented as algorithms in the form of machine readable instructions or implemented in hardware, and stored as a set of emergency routines 355.

The safety module 350 also performs preventative measures that reduce the likelihood of collision if an emergency situation happens. These preventive measures can be stored as a set of preventative routines 357. In particular, the safety module 350 is operable to establish a longitudinal offset to at least one vehicle in an adjacent lane, change lanes or perform any other safety routine. The safety module 350 may determine the longitudinal offset taking into consideration the surroundings of the automated vehicle, using sensor data or information obtained through communications with other vehicles or other external sources. As described in connection with FIG. 4, the safety module 350 can check for certain conditions before enabling the safety routine, and may disable the safety routine if one or more of the conditions is not present.

Figure 4:
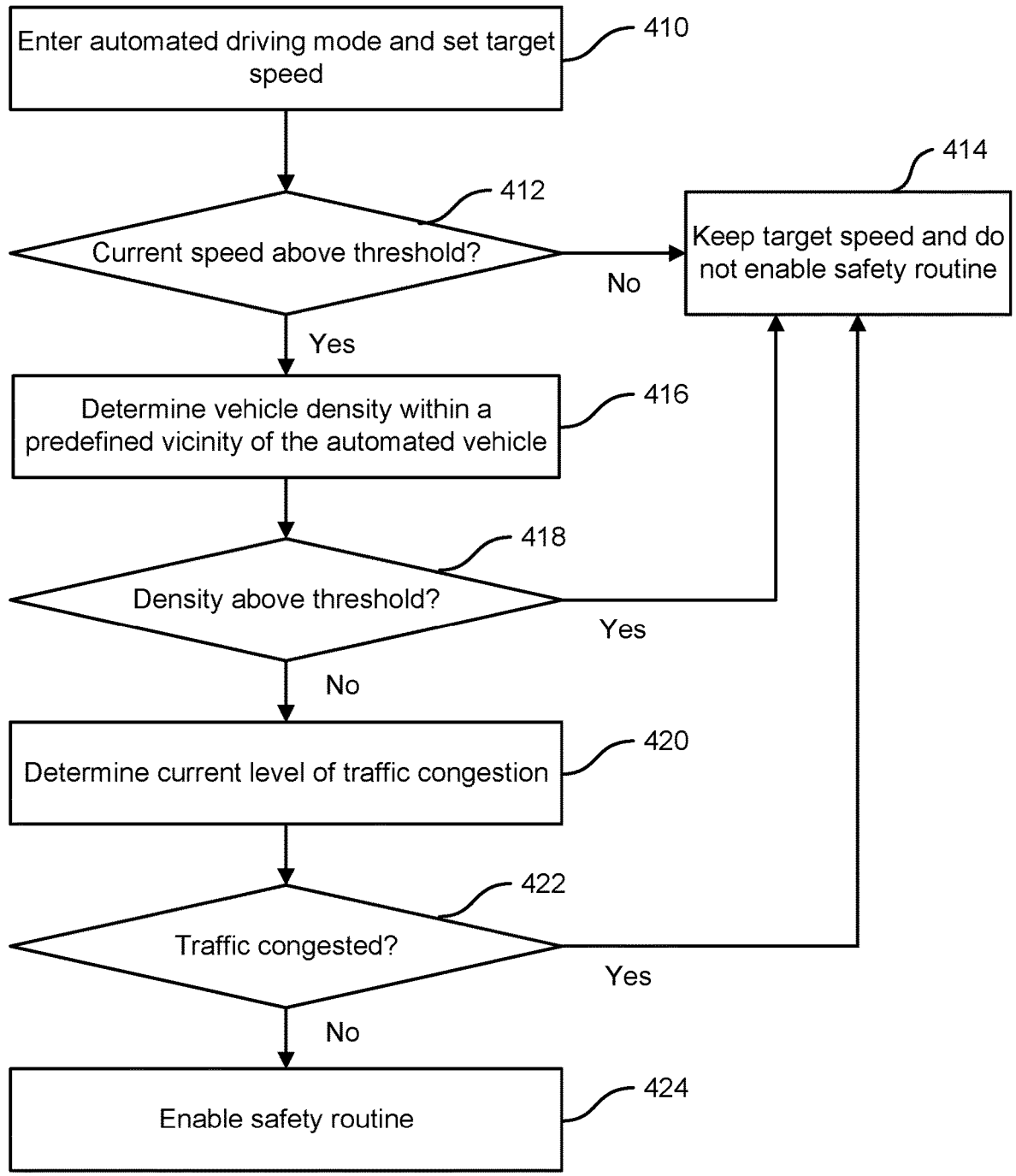
FIG. 4 illustrates a method for enabling a safety routine, according to certain aspects of the present disclosure.

FIG. 4 illustrates a method 400 for enabling a safety routine. The method 400 can be performed by an automated driving control unit, for example the automated driving control unit 300, and begins, at step 410, with the vehicle entering an automated driving mode. As mentioned earlier, an automated driving mode corresponds to SAE level 1 or greater, but for discussion purposes, assume that the vehicle is an automated vehicle. Upon entering the automated driving mode, the automated driving control unit 300 sets a target speed, which can be a speed set selected by the driver (e.g., a speed assigned for use with ACC) or a speed that is automatically selected based on factors such as prevailing traffic conditions, a speed limit for the area in which the vehicle is currently located, and detected speeds of neighboring vehicles.

At 412, the automated driving control unit 300 determines whether the current speed is above a certain threshold. The speed threshold is preferably selected to correspond to travel along a road. For example, the speed threshold can be set to 15 miles per hour (mph) to exclude slower driving situations such as driving within a parking lot or garage. The speed threshold can be fixed or variable, for example depending on the current speed limit. If the current speed is above the speed threshold, the method 400 proceeds to step 416, otherwise the method 400 proceeds to step 414.

At 414, the automated driving control unit 300 keeps the target speed and does not enable the safety routine.

At 416, the automated driving control unit 300 determines the vehicle density within a predefined vicinity of the automated vehicle. Density can be determined by detecting the presence of neighboring vehicles using sensors. For example, vehicles adjacent to the automated vehicle can be detected using the cameras 14, the radar sensors 10, the LIDAR sensors 12, or a combination of camera, radar, and LIDAR sensors. If the neighboring vehicles are sufficiently close, they can also be detected by the ultrasonic sensor 18. In some instances, the sensors may be able to detect vehicles that are not directly adjacent to the automated vehicle. For example, a camera may capture an image in which a rear vehicle and a vehicle behind the rear vehicle are both visible. Similarly, LIDAR and radar sensors can detect signals reflected off vehicles that are partially obstructed by closer vehicles. Using the sensor data, the automated driving control unit 300 can form a model of the vehicles around the automated vehicle and compute the density, for example, based on the total number of vehicles detected within the vicinity.

The model can also be formed using communications with external sources. For example, the system 200 may include a vehicle-to-vehicle communications unit (not shown) including a transceiver that broadcasts information concerning the automated vehicle such as the vehicle's speed and geographical position, and that receives corresponding information from neighboring vehicles within range of the transceiver. In some instances, density information can be provided by traffic monitoring stations, and other external sources that detect traffic.

The vicinity can be localized to a certain range of the automated vehicle. For example, only vehicles within a specified distance of the automated vehicle may be considered when computing density. The distance should be sufficiently long so as to extend beyond adjacent vehicles, e.g., a range of at least three car lengths. The distance may be greater than the detection capability of certain sensors, as the performance characteristics of different types of sensors can vary, e.g., in terms of range and/or precision. The vehicle density within the vicinity can nevertheless be determined using sensor data from at least some of the sensors on board the automated vehicle and/or based on external communications received by the automated vehicle, e.g., communications from an adjacent or nearby vehicle.

At 418, the automated driving control unit 300 determines whether the vehicle density is above a certain threshold. The density threshold can be based on a total number of vehicles within the vicinity. The density threshold can be set to a value that indicates a limited ability to maneuver between lanes. For example, the density threshold can be set assuming a uniform car length and may correspond to a total number of vehicles that can fit into the area of the vicinity with a gap of at least one car length between each vehicle traveling in the same lane. If the density is above the density threshold, then the method 400 returns to step 414, and the safety routine is not enabled. Otherwise, the method 400 proceeds to step 420.

At 420, the automated driving control unit 300 determines the current level of traffic congestion. The congestion level can be determined using the same sources of information as those by which the vehicle density was determined in step 416, e.g., sensors, external sources, or a combination of both. Congestion can be determined based on traffic speed alone or traffic speed in combination with vehicle density. For example, the automated driving control unit 300 may compute an average speed of traffic from the speeds of the automated vehicle and the surrounding vehicles and compare the average speed to a speed threshold associated with traffic congestion. The speed threshold for congestion can be different than the speed threshold in step 412. For example, the threshold for congestion may be set higher to account for stop-and-go traffic, which is characterized by intermittent periods of higher speed followed by periods of lower speed.

The area considered for traffic congestion can be set larger than the vicinity for determining vehicle density because vehicle density is not necessarily uniform in a traffic congestion situation. For example, when traffic is congested, there may be some regions that are very dense and other regions that are less dense, even though the overall speed of traffic is slow.

In some embodiments, the determination of traffic congestion can be based entirely on external communications. For example, vehicles are sometimes equipped with navigation systems that determine the fastest route to a destination based on real-time traffic information gathered through satellite imaging or other information sources, and made available to the navigation systems through a remote server or base station. The automated driving control unit 300 can use the same traffic information to determine the current level of traffic congestion for an area around the vehicle, e.g., the average speed of traffic along a road segment on which the vehicle is traveling.

At 422, the automated driving control unit determines whether traffic is congested based on the level of traffic congestion. As mentioned above, congestion can be determined based on traffic speed alone or traffic speed in combination with density. Thus traffic congestion can be defined according to a threshold speed of traffic, for example, an average speed of 20 mph or lower for an area where the speed limit is 45 mph. Alternatively, congestion can be defined according to a threshold speed of traffic in combination with a density threshold, for example, an average speed of 20 mph or lower in combination with a density of X number of vehicles within the vicinity described in step 416. If there is traffic congestion, the method returns to step 414. Otherwise, the method proceeds to step 424.

At 424, the automated driving control unit 300 enables the safety routine. The automated driving control unit 300 may periodically repeat the method 400 so that the safety routine is disabled if one of the conditions described earlier are subsequently not met. Thus, the performing of the safety routine can be conditioned upon all of the following: the first motor vehicle operating in an automated driving mode in which at least one longitudinal control parameter of the first motor vehicle is automatically controlled (step 410); the first motor vehicle traveling above a threshold speed (step 412); a vehicle density within a predefined vicinity of the first motor vehicle being below a threshold density (step 418); and the first motor vehicle not currently being in a traffic congestion situation (step 422).

Figure 5:
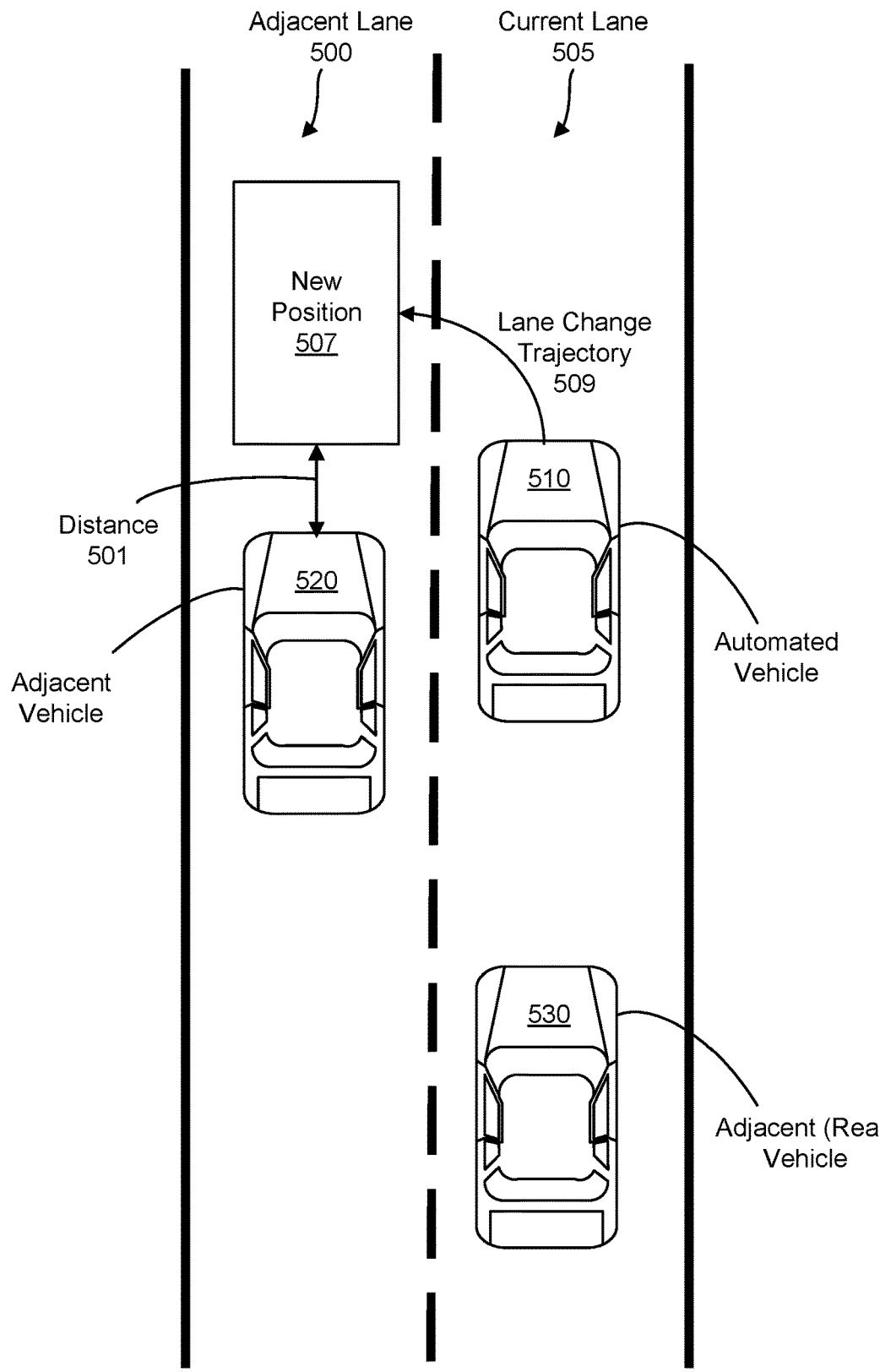
FIG. 5 illustrates a driving scenario in which an automated vehicle is to perform a lane change.

FIG. 5 illustrates a driving scenario in which an automated vehicle 510 is to perform a lane change from a current lane 505 to an adjacent lane 500. Assuming the conditions for enabling the safety routine in method 400 are met, the automated driving control unit 300 can monitor the position of an adjacent vehicle 520 to determine whether the automated vehicle 510 can safely perform a lane change to move into a new position 507 in the event of an emergency, e.g., to avoid an obstacle in lane 505. For example, using data collected by the sensor suite, the automated driving control unit 300 can determine a lane change trajectory 509 for moving into the position 507 and estimate a longitudinal distance 501 between the automated vehicle 510 and the adjacent vehicle 520 that would exist if the automated vehicle 510 were to follow the lane change trajectory 509 into position 507. The lane change trajectory 509 may describe the path of the automated vehicle 510 in terms of position at various points in time, and may include associated longitudinal and/or lateral control inputs (e.g., an amount of steering to be applied in order to follow the trajectory).

In 2002, the International Organization for Standardization (ISO) Technical Committee 204, Working Group 14 established standards for a Forward Vehicle Collision Warning System (FVCWS), requiring the system to address collisions between a subject vehicle and vehicles or other obstacles in front of the subject vehicle. An FVCWS uses sensors to obtain speed and distance between the subject vehicle and a forward vehicle in the same lane, checks this data against warning criteria, and provides the driver of the subject vehicle with a warning when the relative distance between the forward vehicle and the subject vehicle is below a pre-set warning distance that takes into account the speeds of both vehicles, the accelerations or decelerations of both vehicles, and the brake reaction time of the driver of the subject vehicle, according to the following formula:

$$D <= V^*T + (V^2/2a - V_f^2/2a_f)$$

where D is the following distance of the subject vehicle, V is the velocity of the subject vehicle, $V_f$ is the velocity of the forward vehicle, T is the brake reaction time, a is the acceleration or deceleration of the subject vehicle, and $a_f$ is the acceleration or deceleration of the forward vehicle.

Figure 6:
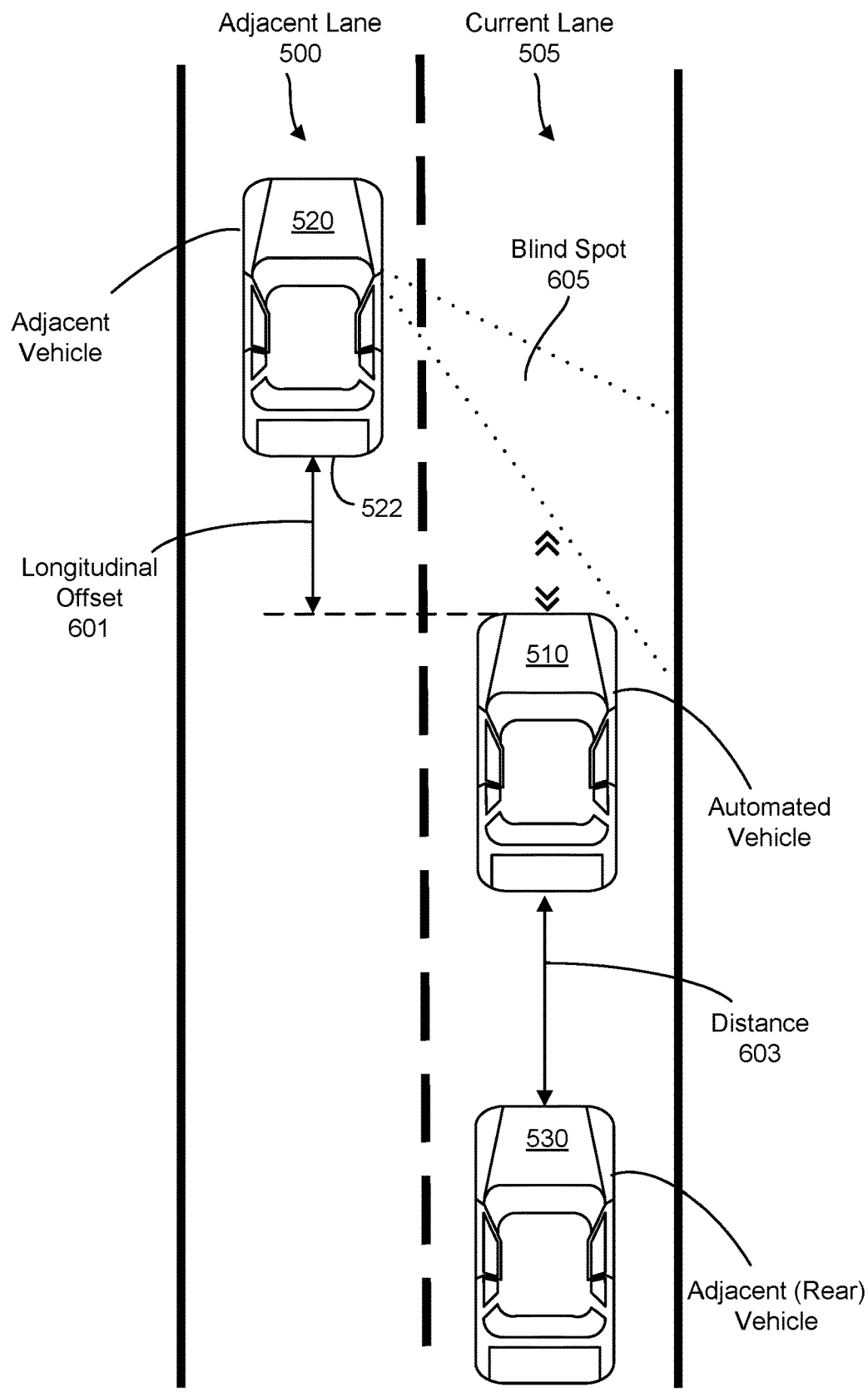
FIG. 6 illustrates a driving scenario in which an automated vehicle establishes a longitudinal offset to a vehicle in an adjacent lane.

The formula above can be adapted to determine whether there would be sufficient distance between the automated vehicle 510 (the forward vehicle in this instance) and the adjacent vehicle 520. For example, the automated driving control unit 300 can estimate the velocities and accelerations or decelerations of the automated vehicle 510 and the adjacent vehicle 520 for when the automated vehicle 510 reaches the position 507 (e.g., assuming the automated vehicle 510 follows the lane change trajectory 509 and preferably while maintaining the same speed) and taking into consideration the amount of time needed to maneuver into position 507. If the distance D calculated based on velocity, acceleration, and a minimum Time-To-Collision (TTC) (i.e., the closest that the automated vehicle 510 is permitted to get to the adjacent vehicle 520 in terms of time to collision between both vehicles) is less than a certain threshold distance, the automated driving control unit 300 may decide that there is insufficient room to change into the lane 500. In response to this determination, the automated driving control unit 300 can trigger a speed decrease, as shown in FIG. 6, or any other safety routine that positions the vehicle in a safe situation with respect to other vehicles in its vicinity if an unexpected emergency happens. An example formula for calculating TTC is discussed below in connection with FIG. 7.

FIG. 6 illustrates a driving scenario in which the automated vehicle 510 establishes a longitudinal offset 601 to the adjacent vehicle 520. The automated driving control unit 300 can establish the longitudinal offset 601 by triggering a speed decrease to permit the adjacent vehicle 520 to move ahead of the automated vehicle 510. The longitudinal offset 601 can be specified in terms of a distance between the rear of the adjacent vehicle 520 and the front of the automated vehicle 510. Defining the longitudinal offset in this manner prevents any longitudinal overlap between the automated vehicle 510 and the adjacent vehicle 520. Alternative definitions of the longitudinal offset are also possible. For example, the longitudinal offset can be defined in terms of a longitudinal distance between midpoints of the automated vehicle 510 and the adjacent vehicle 520. Additionally, the longitudinal offset can be defined as a distance sufficient to move the automated vehicle 510 out of a blind spot 605 of the adjacent vehicle 520. In some embodiments, the automated driving control unit 300 may permit a small degree of longitudinal overlap (e.g., one meter) because such a driving formation, while not being completely safe, is nevertheless safer than permitting the automated vehicle 510 to travel exactly side-by-side with the adjacent vehicle 520.

When the speed of the automated vehicle 510 is decreased, a distance 603 between the automated vehicle 510 and a rear vehicle 530 in the same lane may also decrease, at least initially. The automated driving control unit 300 can monitor the position of the rear vehicle 530 so as to maintain a safe distance between the automated vehicle 510 and the rear vehicle 530 while the speed of the automated vehicle 510 is being decreased. Further, if the speed of the automated vehicle 510 is gradually decreased over time, the driver of the rear vehicle 530 can adjust his or her speed accordingly, so that the distances between the automated vehicle 510 and the rear vehicle 530 are approximately the same before and after the speed decrease. Additionally, setting of an appropriate value for the density threshold applied in step 418 of method 400 can prevent the safety routine from being enabled in situations where a speed decrease would pose a risk of collision with a rear vehicle.

Figure 7:
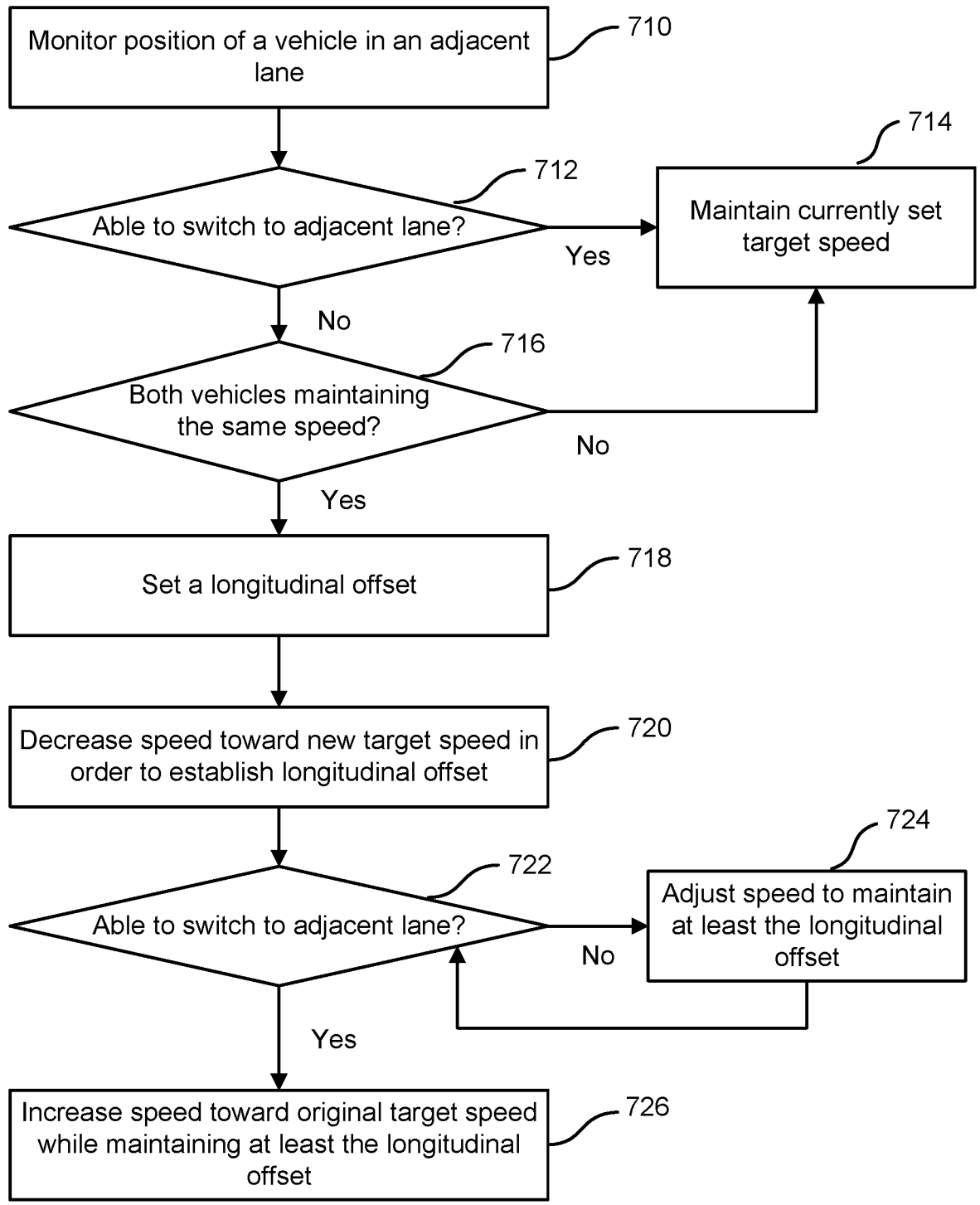
FIG. 7 illustrates a safety routine according to certain aspects of the present disclosure.

FIG. 7 illustrates a safety routine 700 that implements some of the features described earlier in connection with FIGS. 5 and 6.

At 710, the automated driving control unit 300 monitors the position of a vehicle in an adjacent lane, e.g., the adjacent vehicle 520.

At 712, the automated driving control unit 300 determines, based on sensor data, whether the automated vehicle 510 is able to switch to the adjacent lane (e.g., in case of an emergency or any other driving scenario that needs a quick lane change). Step 712 can be performed in the manner described above in connection with FIG. 5 and may involve determining, based on the sensor data, whether the automated vehicle can switch to the adjacent lane while following a calculated lane change trajectory, without colliding with the adjacent vehicle. In another example the automated vehicle may not calculate a trajectory, and may only determine if an evasive lane change maneuver would be possible in case of an emergency. If the automated vehicle 510 is able to switch lanes, then the safety routine 700 proceeds to step 714. Otherwise, the safety routine 700 proceeds to step 716.

At 714, the automated driving control unit 300 has determined in step 712 that the automated vehicle 510 is able to switch to the adjacent lane if needed. Therefore, the current position of the automated vehicle with respect to other vehicles in its vicinity is considered to be safe (e.g., likelihood of a collision is minimal if a hazardous situation happens that requires evasive maneuvers.) Accordingly, the automated driving control unit 300 maintains the currently set target speed, e.g., the target speed set in step 410 of method 400.

At 716, the automated driving control unit 300 determines, based on the sensor data, whether the automated vehicle 510 and the adjacent vehicle 520 are maintaining the same speed. The speed determination can be approximate. For example, a speed difference of up to 5 mph may be regarded as the same. In one embodiment, the speed determination is based on the instantaneous speeds of the automated vehicle 510 and the adjacent vehicle 520. In another embodiment, the automated driving control unit 300 can monitor the speeds of the automated vehicle 510 and the adjacent vehicle 520 over a period of time before making the speed determination. For example, the automated driving control unit 300 may condition a positive determination of same speed travel on the speed difference being 5 mph or less for the entire duration of a 10 second period. The length of this time period can vary. For example, a longer time period may be applied when the automated vehicle 510 is traveling at a higher speed. If both vehicles are not maintaining the same speed, then the safety routine 700 returns to step 714. Otherwise, the safety routine 700 proceeds to step 718.

At 718, the automated driving control unit 300 sets a longitudinal offset (e.g., the longitudinal offset 601) to be established between the automated vehicle 510 and the adjacent vehicle 520. The length of the longitudinal offset can vary based on input parameters (which can be supplied by the sensor suite and/or external communications) such as speed, acceleration, road or weather conditions, and other information describing the states of the automated vehicle 510 and the adjacent vehicle 520 or the surrounding environment. For example, if the automated vehicle 510 is traveling at high speed or on a wet road, the automated driving control unit 300 may set a larger longitudinal offset compared to if the automated vehicle 510 is traveling at low speed or on a dry road. The longitudinal offset can be set according to a lookup table that maps the input parameters to different longitudinal offset values. The lookup table can be stored in a memory assigned to or accessible by the safety module 350. The longitudinal offset values in the lookup table may correspond to distances that achieve a minimum time to collision between the automated vehicle 510 and the adjacent vehicle 520 (e.g., in case of a lane change) given a combination of input parameters, e.g., based on the speeds and accelerations of both vehicles. Thus, the longitudinal offset can be set to achieve at least a minimum time to collision if a hazardous situation happens that requires changing lanes and moving to the adjacent lane 500.

In general, the goal is to ensure a certain distance exists in a longitudinal direction between vehicle 520 and the automated vehicle 510, in case of a sudden evasive maneuver that would force the automated vehicle 510 to change lanes and follow vehicle 520. In one embodiment, the lane change maneuver may happen with minimal change in the longitudinal speed profile of the automated vehicle.

In one example, the automated vehicle may calculate a longitudinal Time-To-Collision (TTC) to determine whether enough "safe" time (or distance) in the longitudinal direction exists. The automated vehicle may check to make sure that the TTC is more than a predefined value. For example, the condition "TTC greater than 0.5 seconds" can be used for alerting the driver that he/she is too close to the front vehicle (i.e., when the TTC falls to 0.5 seconds or less). The TTC can be determined as follows:

$$-R = \tfrac{1}{2} a \times TTC^2 + \dot{R} \times TTC$$

where:
R=Range;
$\dot{R}$=Lead vehicle velocity minus Following vehicle velocity;
A=Lead vehicle acceleration.
TTC can thus be derived using the following formula:

$$TTC = -\frac{\dot{R} + \sqrt{(\dot{R})^2 - (2a)(R)}}{a}$$

At 720, the automated driving control unit 300 sets a new target speed and automatically decreases the speed of the automated vehicle 510 toward the new target speed in order to establish the longitudinal offset set in step 718. The automated driving control unit 300 can determine the new target speed based on the current speed and acceleration of the automated vehicle 510 in relation to the adjacent vehicle 520. For example, the new target speed can be calculated so that the longitudinal offset is established within a certain time period after reaching the new target speed, e.g., within 10 seconds. If the automated vehicle 510 is being followed by another vehicle in the same lane (e.g., vehicle 530), the automated driving control unit 300 can set a longer time period for establishing the longitudinal offset.

The speed decrease can be effected through a longitudinal control parameter, e.g., acceleration and/or braking. In most situations, the automated driving control unit 300 can perform the speed decrease by adjusting the engine throttle to cause the automated vehicle 510 to gradually decelerate until the new target speed is reached. When the time period for establishing the longitudinal offset is relatively short, the automated driving control unit 300 can apply braking alone or braking in combination with deceleration, in order to reach the new target speed more rapidly.

At 722, the automated driving control unit 300, after having established the longitudinal offset, determines again whether the automated vehicle 510 is able to switch to the adjacent lane while maintaining the current speed, i.e., the new target speed to which the automated vehicle was decreased in step 720. The determination of whether the automated vehicle 510 is able to switch to the adjacent lane can be performed in a similar manner as described above in connection with FIG. 5, except that the forward vehicle is now the adjacent vehicle 520 and the following vehicle is the automated vehicle 510. As with the determination in step 712, a positive determination that the automated vehicle 510 is able to switch to the adjacent lane may, but does not have to, require that the automated vehicle be able to maintain the same speed while following a lane change trajectory without colliding with the adjacent vehicle. If the automated vehicle 510 is unable to switch to the adjacent lane, the safety routine 700 proceeds to step 724. Otherwise, the safety routine proceeds to step 726.

At 724, the automated driving control unit 300 automatically adjusts the speed of the automated vehicle 510 to maintain at least the longitudinal offset from step 718. For example, the automated driving control unit 300 can increase the deceleration of the automated vehicle 510. Alternatively, the automated driving control unit 300 can maintain the same deceleration from 720 and simply extend the time period over which the automated vehicle 510 is decelerated. Steps 722 and 724 are repeated until the automated driving control unit 300 determines that the automated vehicle 510 is able to switch to the adjacent lane (if needed).

At 726, the automated vehicle 510 is now able to switch to the adjacent lane, meaning the adjacent vehicle 520 has moved sufficiently ahead to permit the automated vehicle 510 to maneuver into the adjacent lane without risk of colliding with the adjacent vehicle 520. Accordingly, the automated driving control unit 300 can automatically increase the speed of the automated vehicle 510 toward the original target speed (e.g., the target speed set in step 410 of method 400) while maintaining at least the longitudinal offset. Thus, the automated driving control unit 300 can automatically increase the speed to maintain a target speed that was set prior to a speed decrease, after a longitudinal offset associated with the speed decrease has been established.

The safety routine 700 has been described with respect to a longitudinal offset established using a speed decrease. However, it is also possible to establish a longitudinal offset by increasing the speed of the automated vehicle 510 to cause the automated vehicle 510 to move ahead of the adjacent vehicle 520. For example, the speed can be increased if the current speed is below the target speed set in step 410 of method 400. In some embodiments, the speed can be increased even though the automated vehicle 510 is already traveling at the target speed. This may be the case when the target speed is below the speed limit of the road in which the automated vehicle 510 is traveling.

Figure 8:
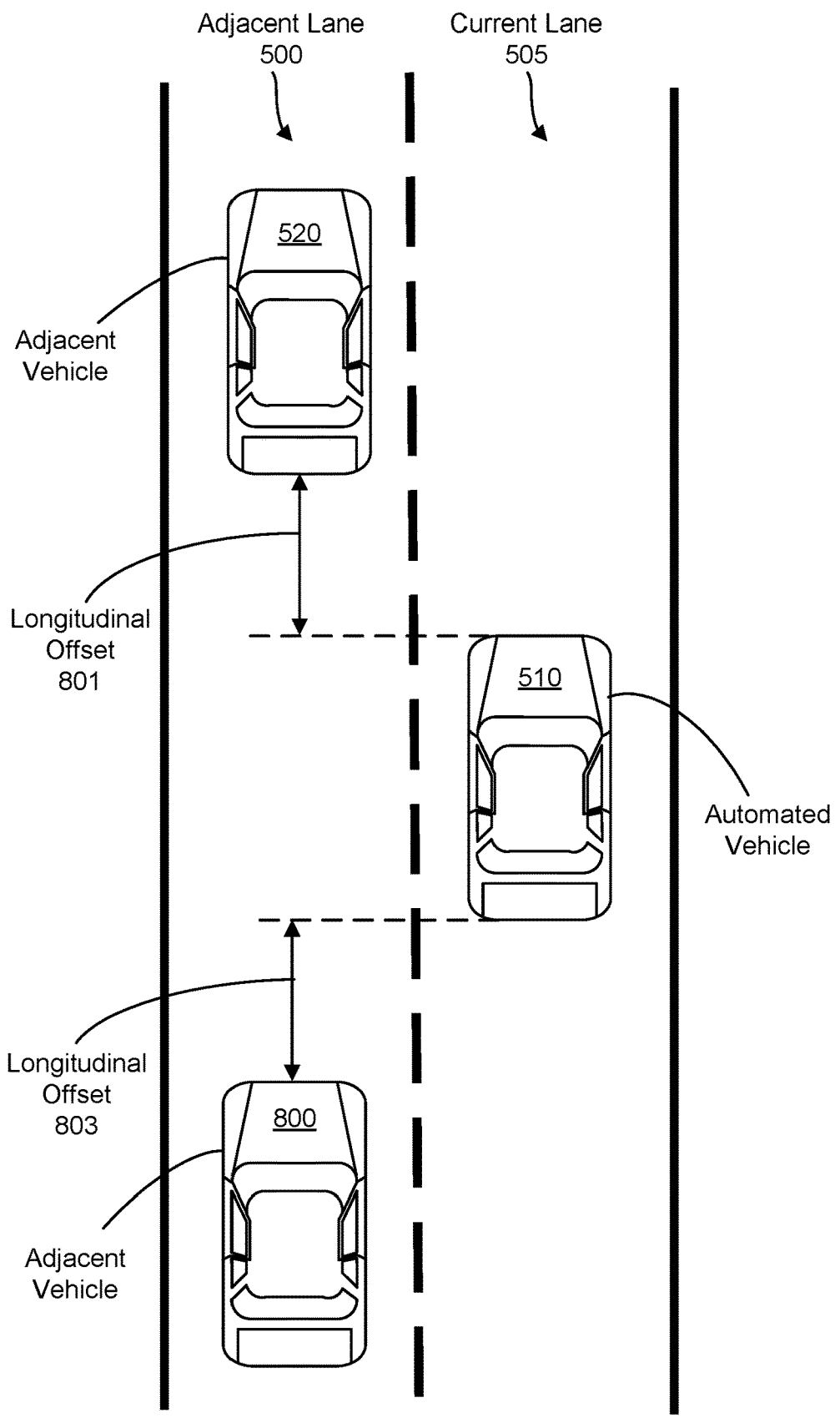
FIG. 8 illustrates a driving scenario in which an automated vehicle establishes longitudinal offsets to two vehicles in an adjacent lane.

FIG. 8 illustrates a driving scenario in which the automated vehicle 510 establishes a longitudinal offset 801 to the vehicle 520 in adjacent lane 500 and a longitudinal offset 803 to a vehicle 800 that is also in the adjacent lane 500. As shown in FIG. 8, the longitudinal offsets 801 and 803 can be set so that the automated vehicle 510 is positioned between the adjacent vehicles 520 and 800, with adjacent vehicle 520 in a forward position and adjacent vehicle 800 in a rear position. The automated driving control unit 300 can set the longitudinal offsets 801 and 803 to be equal so that automated vehicle 510 moves into a position equidistant to the adjacent vehicles 520 and 800. This may be in response to determining that all three vehicles 510, 520, and 800 are maintaining the same travel speed. However, if one of the adjacent vehicles 520 and 800 is traveling at a different speed than the other, the automated driving control unit 300 can determine an optimal driving formation by setting a larger longitudinal offset between the automated vehicle 510 and whichever adjacent vehicle is faster. Alternatively, the automated driving control unit 300 can prioritize the longitudinal offset 803 to the rear adjacent vehicle 800 to give the automated vehicle 510 more room to change into lane 500. Thus, the automated driving control unit 300 can adjust the speed of the automated vehicle 510 to maximize the distances to the closest surrounding vehicles in an adjacent lane, taking into consideration the objective of providing the automated vehicle 510 with the ability to maneuver into the adjacent lane if needed.

Figure 9:
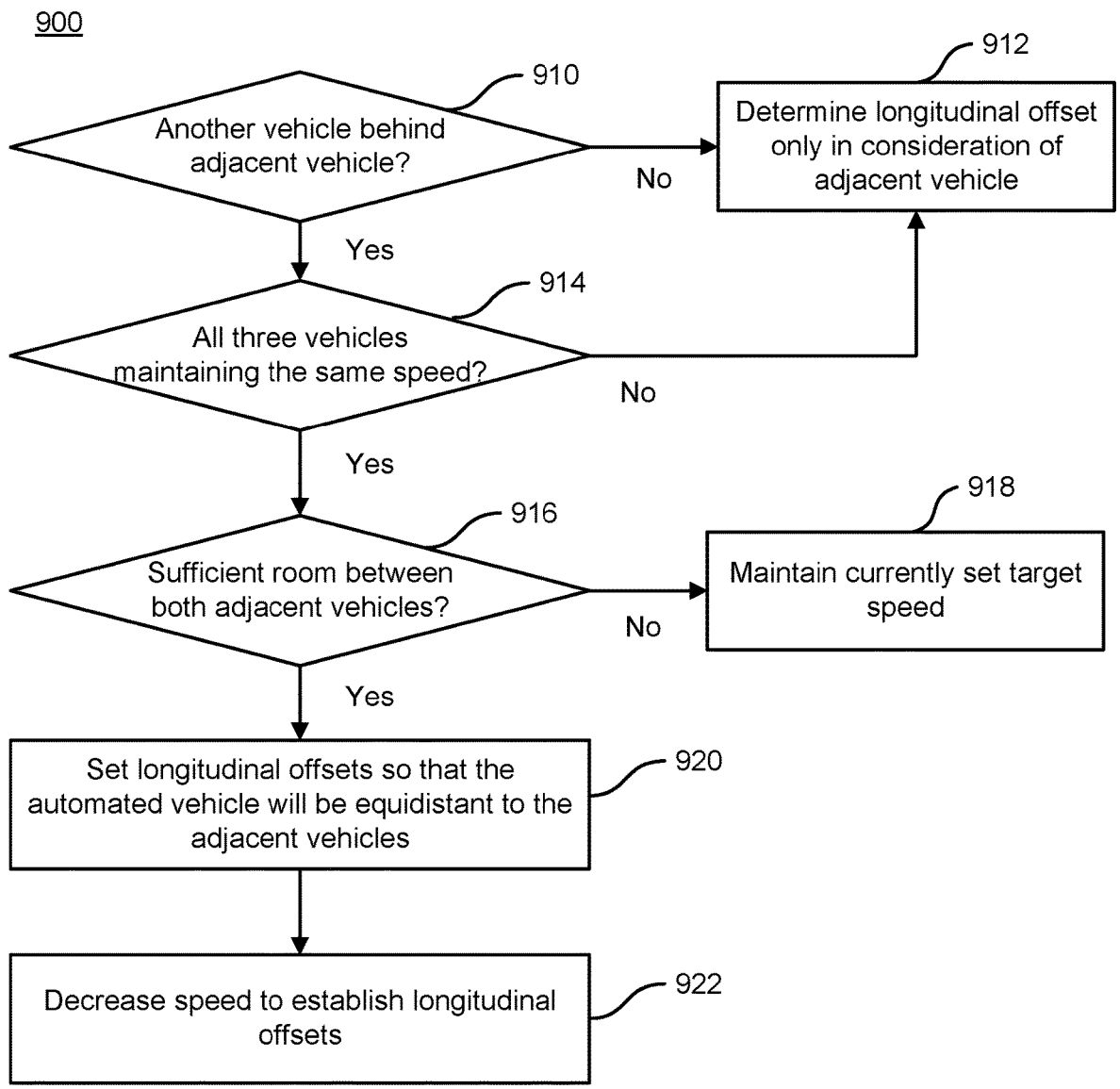
FIG. 9 illustrates a safety routine according to certain aspects of the present disclosure.

FIG. 9 illustrates a safety routine 900 that implements the longitudinal offsets shown in FIG. 8. In the embodiment of FIG. 9, the automated driving control unit 300 determines the longitudinal offsets to the adjacent vehicles if all three vehicles 510, 520, and 800 are maintaining the same speed. However, as mentioned above, it is also possible to establish longitudinal offsets even if one of the adjacent vehicles is traveling at a different speed than the other.

At 910, the automated driving control unit 300 determines whether there is another vehicle behind the adjacent vehicle 520, e.g., vehicle 800. If there is no vehicle behind adjacent vehicle 520, the safety routine 900 proceeds to step 912. Otherwise, the safety routine 900 proceeds to step 914.

At 912, the automated driving control unit 300 determines a longitudinal offset only in consideration of the adjacent vehicle 520. For example, the longitudinal offset can be set in the manner described above with respect to safety routine 700.

At 914, the automated driving control unit 300 determines whether all three vehicles 510, 520, and 800 are maintaining the same speed. As mentioned earlier, the vehicles do not have to be traveling at the same exact speed, so long as the speed difference is insignificant. If this condition is false, the safety routine 900 returns to step 912.

At 916, the automated driving control unit 300 determines whether there is sufficient room between the adjacent vehicles 520 and 800. For example, the automated driving control unit 300 can calculate a minimum safe driving distance with respect to each adjacent vehicle 520, 800 and determine whether the total distance between the adjacent vehicles 520, 800 is equal to or greater than the sum of the minimum safe driving distances. If there is insufficient room, the safety routine proceeds to step 918. Otherwise, the safety routine proceeds to step 920. In one example, the automated vehicle may check the other adjacent lane to see if it can find a safe position in case of an emergency.

At 918, the automated driving control unit 300 maintains the currently set target speed because the determination in step 916 indicates that there is no longitudinal offset that would provide the automated vehicle 510 with the ability to change to the adjacent lane 500.

At 920, the automated driving control unit 300 sets the longitudinal offsets 801 and 803 so that the automated vehicle 510 will be in a safe position with respect to the adjacent vehicles 520, 800.

At 922, the automated driving control unit 300 decreases the speed of the automated vehicle 510 to establish the longitudinal offsets 801, 803.

Figure 10:
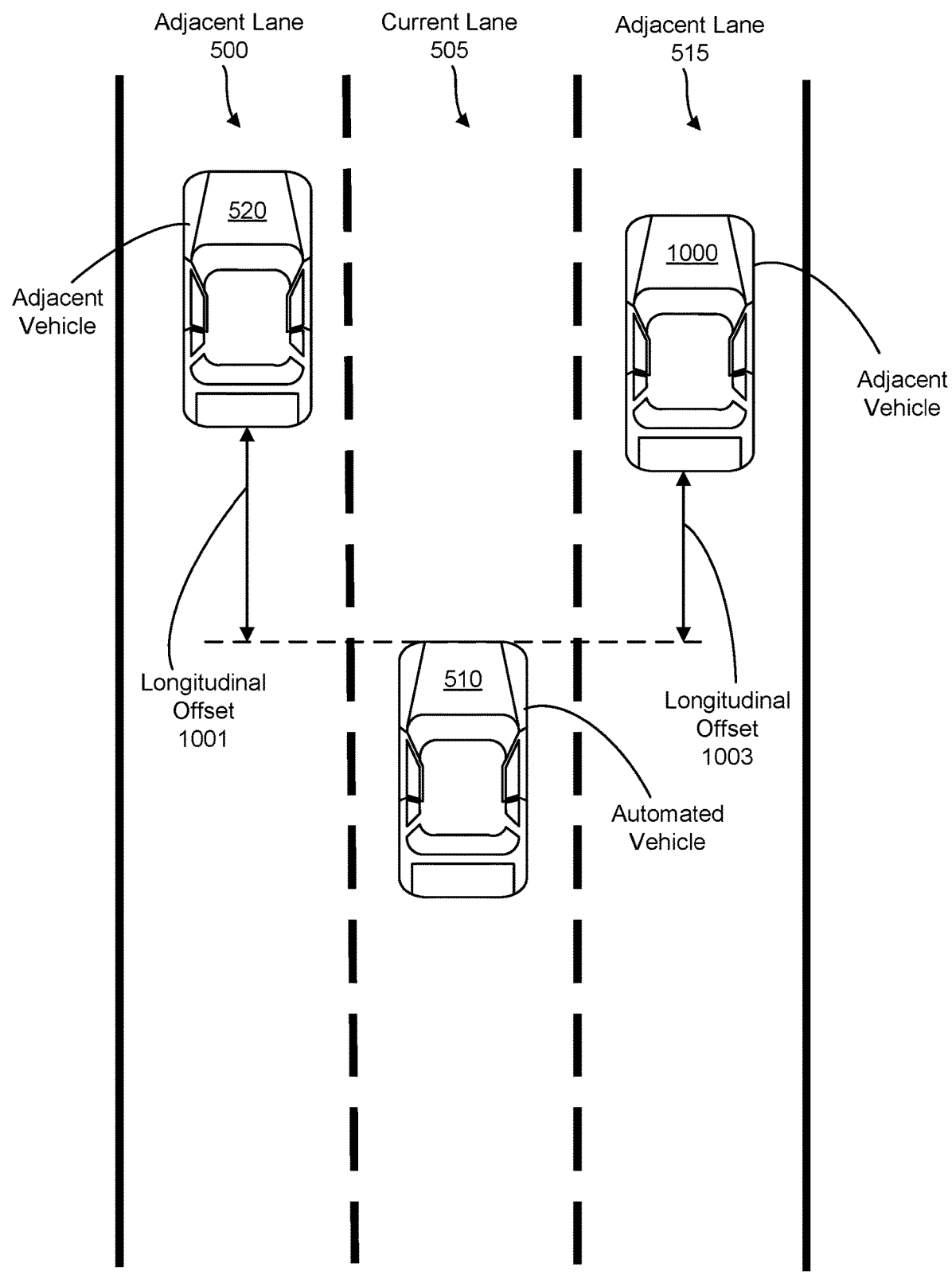
FIG. 10 illustrates a driving scenario in which an automated vehicle establishes longitudinal offsets to two vehicles in opposing adjacent lanes.

FIG. 10 illustrates a driving scenario in which the automated vehicle 510 establishes a longitudinal offset 1001 to the adjacent vehicle 520 in adjacent lane 500 and a longitudinal offset 1003 to a vehicle 1000 in an opposing adjacent lane 515. FIG. 10 is an example of a three lane driving scenario in which the automated driving control unit 300 monitors adjacent vehicles to the left and right of the automated vehicle 510. The longitudinal offsets 1001 and 1003 can be established in the same manner as described earlier with respect to the two lane scenario in FIG. 6. As shown in FIG. 10, the longitudinal offsets 1001 and 1003 can be different as a result of the relative positions of the adjacent vehicles 520, 1000. The adjacent vehicle 520 is slightly ahead of the adjacent vehicle 1000, so the longitudinal offset 1001 is larger than the longitudinal offset 1003. Thus, a safety routine performed with respect to a second vehicle in an adjacent lane can be repeated for a third vehicle in an opposing adjacent lane, in order to establish a longitudinal offset between the automated vehicle and the third vehicle while maintaining at least a longitudinal offset between the automated vehicle and the second vehicle.

Figure 11:
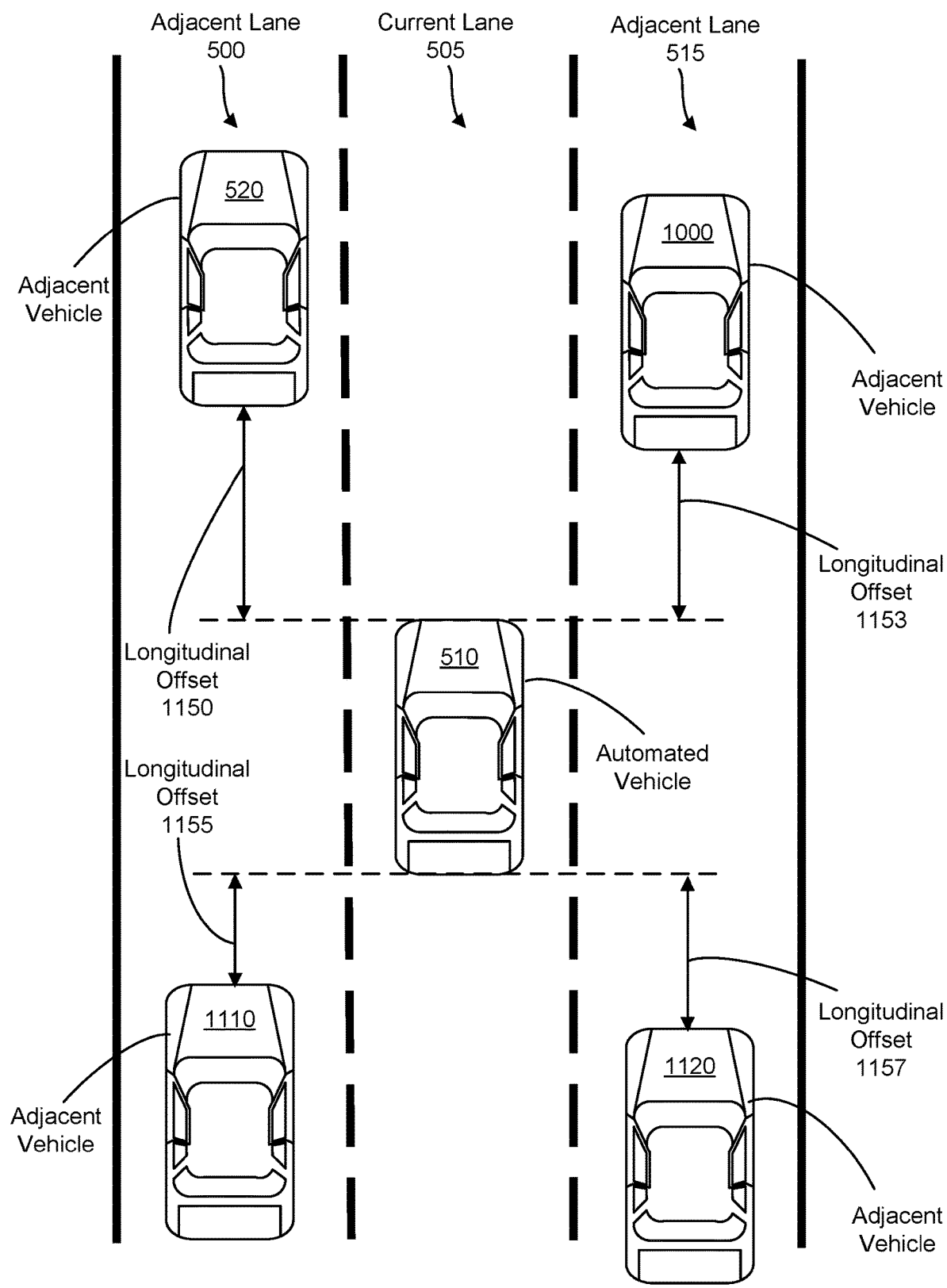
FIG. 11 illustrates a driving scenario in which an automated vehicle establishes longitudinal offsets to four vehicles in opposing adjacent lanes.

FIG. 11 illustrates a driving scenario in which the automated vehicle 510 establishes longitudinal offsets 1150, 1153, 1155, and 1157 to adjacent vehicles 520, 1000, 1110, and 1120, respectively. The vehicles 520 and 1110 are in the left adjacent lane 500. The vehicles 1000 and 1120 are in the right adjacent lane 515. FIG. 11 is an example of a quincunx formation in which automated vehicle 510 is at the center, surrounded by adjacent vehicles 520, 1000, 1110, and 1120. As with the two lane scenario in FIG. 8, the automated driving control unit 300 can determine an optimal driving formation, in this instance with respect to all four adjacent vehicles 520, 1000, 1110, and 1120. Optimization may yield a quincunx formation as shown in FIG. 11, in which the automated vehicle 510 has the ability to maneuver into either one of the adjacent lanes 500, 515.

In some embodiments, the automated driving control unit 300 does not determine an optimal driving formation, but instead maintains a longitudinal offset with respect to less than all of the adjacent vehicles 520, 1000, 1110, and 1120. For example, the longitudinal offset 1150 and/or the longitudinal offset 1155 can be maintained without setting the longitudinal offsets 1153 and 1157. This would provide the automated vehicle 510 with the ability to change to adjacent lane 500 while conserving computing resources. Thus, the safety routine can be terminated after establishing a longitudinal offset and determining that there is an adjacent lane that the automated motor vehicle can switch to without changing speed and without colliding with another vehicle. In this manner, at least one lane change maneuver can be made available to the automated vehicle 510 at any given time.

Some portions of this description describe the embodiments of the disclosure in terms of algorithms and operations. These operations are understood to be implemented by computer programs or equivalent electrical circuits, machine code, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. Although the steps, operations, or processes are described in sequence, it will be understood that in some embodiments the sequence order may differ from that which has been described, for example with certain steps, operations, or processes being omitted or performed in parallel or concurrently.

In some embodiments, a software module is implemented with a computer program product comprising a non-transitory computer-readable storage medium containing computer program code, which can be executed by one or more computer processors for performing any or all of the steps, operations, or processes described. Examples of a non-transitory storage medium include, but are not limited to, a magnetic disk or tape, optical storage media such as compact disk (CD) or digital versatile disk (DVD), flash memory, or other memory devices.

The specification and drawings are, accordingly, to be regarded in an illustrative rather than a restrictive sense. It will, however, be evident that additions, subtractions, deletions, and other modifications and changes may be made thereunto without departing from the broader spirit and scope set forth in the claims. Thus, although specific embodiments have been described, these are not intended to be limiting. Various modifications and equivalents are within the scope of the following claims.

What is claimed is:

1. A computer implemented method, comprising:
monitoring, by a processor of a computer in a first motor vehicle, a position of a second motor vehicle in an adjacent lane; and
performing an automated safety routine, including:
determining, by the processor and based on sensor data indicating positions and speeds of the first motor vehicle and the second motor vehicle, whether the first motor vehicle and the second motor vehicle are maintaining a same speed,
determining, by the processor and based on the sensor data, whether the first motor vehicle can switch to the adjacent lane without colliding with the second motor vehicle,
responsive to determining that the first motor vehicle and the second motor vehicle are maintaining the same speed and that the first motor vehicle cannot switch to the adjacent lane without colliding with the second motor vehicle, determining, based on the sensor data, a longitudinal offset to establish between the first motor vehicle the second motor vehicle, and establishing the longitudinal offset by automatically decreasing the speed of the first motor vehicle, wherein the determining of the longitudinal offset to establish and the establishing of the longitudinal offset are performed only when it has been determined that the first motor vehicle and the second motor vehicle are maintaining the same speed and that the first motor vehicle cannot switch to the adjacent lane without colliding with the second motor vehicle, and
automatically adjusting the speed of the first motor vehicle to maintain at least the longitudinal offset until the processor determines that the first motor vehicle can switch to the adjacent lane without colliding with the second motor vehicle.

2. The method of claim 1, wherein the decreasing of the speed of the first motor vehicle positions the first motor vehicle at an offset from the second motor vehicle with no longitudinal overlap between the first motor vehicle and the second motor vehicle.

3. The method of claim 1, wherein determining the longitudinal offset to establish comprises:
setting the longitudinal offset to achieve a value that achieves at least a minimum time to collision.

4. The method of claim 1, further comprising:
conditioning the performing of the safety routine upon all of the following:
the first motor vehicle operating in an automated driving mode in which at least one longitudinal control parameter of the first motor vehicle is automatically controlled;
the first motor vehicle traveling above a threshold speed;
a vehicle density within a predefined vicinity of the first motor vehicle being below a threshold density; and the first motor vehicle not currently being in a traffic congestion situation.

5. The method of claim 4, further comprising:
determining the vehicle density using data captured by a plurality of sensors onboard the first motor vehicle, wherein the predefined vicinity extends beyond the second motor vehicle.

6. The method of claim 4, further comprising:
determining the vehicle density or whether the first motor vehicle is currently in a traffic congestion situation, based on external communications received by the first motor vehicle.

7. The method of claim 1, further comprising:
after the longitudinal offset is established, determining based on updated sensor data that the first motor vehicle can switch to the adjacent lane without further changing speed, and without colliding with the second motor vehicle; and
responsive to the determining based on the updated sensor data, automatically increasing the speed of the first motor vehicle to maintain a target speed that was set prior to the speed decrease.

8. The method of claim 1, further comprising:
responsive to determining, by the processor, that there is a third motor vehicle behind the first motor vehicle and that the third motor vehicle is traveling at the same speed as the first motor vehicle and the second motor vehicle, setting the longitudinal offset such the first motor vehicle becomes equidistant to the second motor vehicle and third motor vehicle.

9. The method of claim 1, further comprising:
repeating the safety routine with respect to a third motor vehicle in an opposing adjacent lane to establish a longitudinal offset between the first motor vehicle and the third motor vehicle, while maintaining at least the longitudinal offset between the first motor vehicle and the second motor vehicle, wherein repeating the safety routine with respect to the third motor vehicle includes:
determining, by the processor and based on additional sensor data indicating positions and speeds of the first motor vehicle and the third motor vehicle, whether the first motor vehicle and the third motor vehicle are maintaining a same speed;
determining, by the processor and based on the additional sensor data, whether the first motor vehicle can switch to the opposing adjacent lane without colliding with the third motor vehicle; and
responsive to determining that the first motor vehicle and the third motor vehicle are maintaining the same speed and that the first motor vehicle cannot switch to the opposing adjacent lane without colliding with the third motor vehicle, determining, based on the additional sensor data, a second longitudinal offset to establish between the first motor vehicle the third motor vehicle, and establishing the second longitudinal offset by automatically decreasing the speed of the first motor vehicle.

10. The method of claim 1, further comprising:
after the longitudinal offset is established, terminating the safety routine in response to determining, by the processor, that there is an adjacent lane that the first motor vehicle can switch to without changing speed and without colliding with another motor vehicle.

11. An automated driving apparatus, comprising:
a control circuit in a first motor vehicle, the control circuit operable to:
monitor a position of a second motor vehicle in an adjacent lane; and
perform an automated safety routine, including:
determining, based on sensor data indicating positions and speeds of the first motor vehicle and the second motor vehicle, whether the first motor vehicle and the second motor vehicle are maintaining a same speed,
determining, based on the sensor data, whether the first motor vehicle can switch to the adjacent lane without colliding with the second motor vehicle,
responsive to determining that the first motor vehicle and the second motor vehicle are maintaining the same speed and that the first motor vehicle cannot switch to the adjacent lane without colliding with the second motor vehicle, determining, based on the sensor data, a longitudinal offset to establish between the first motor vehicle the second motor vehicle, and establishing the longitudinal offset by automatically decreasing the speed of the first motor vehicle, wherein the control circuit is configured to perform the determining of the longitudinal offset to establish and the establishing of the longitudinal offset only when it has been determined that the first motor vehicle and the second motor vehicle are maintaining the same speed and that the first motor vehicle cannot switch to the adjacent lane without colliding with the second motor vehicle, and
automatically adjusting the speed of the first motor vehicle to maintain at least the longitudinal offset until the first motor vehicle can switch to the adjacent lane without colliding with the second motor vehicle.

12. The automated driving apparatus of claim 11, wherein the decreasing of the speed of the first motor vehicle positions the first motor vehicle at an offset from the second motor vehicle with no longitudinal overlap between the first motor vehicle and the second motor vehicle.

13. The automated driving apparatus of claim 11, wherein the control circuit is operable to set the longitudinal offset to a value that achieves at least a minimum time to collision.

14. The automated driving apparatus of claim 11, wherein the control circuit is further operable to:
condition the performing of the safety routine upon all of the following:
the first motor vehicle operating in an automated driving mode in which at least one longitudinal control parameter of the first motor vehicle is automatically controlled;
the first motor vehicle traveling above a threshold speed;
a vehicle density within a predefined vicinity of the first motor vehicle being below a threshold density; and
the first motor vehicle not currently being in a traffic congestion situation.

15. The automated driving apparatus of claim 14, wherein the control circuit is further operable to:
determine the vehicle density using data captured by a plurality of sensors onboard the first motor vehicle, wherein the predefined vicinity extends beyond the second motor vehicle.

16. The automated driving apparatus of claim 14, wherein the control circuit is further operable to:

determine the vehicle density or whether the first motor vehicle is currently in a traffic congestion situation, based on external communications received by the first motor vehicle.

17. The automated driving apparatus of claim 11, wherein the control circuit is further operable to:
after the longitudinal offset is established, determine based on updated sensor data that the first motor vehicle can switch to the adjacent lane without further changing speed, and without colliding with the second motor vehicle; and
responsive to the determination based on the updated sensor data, automatically increase the speed of the first motor vehicle to maintain a target speed that was set prior to the speed decrease.

18. The automated driving apparatus of claim 11, wherein the control circuit is further operable to:
responsive to determining that there is a third motor vehicle behind the first motor vehicle and that the third motor vehicle is traveling at the same speed as the first motor vehicle and the second motor vehicle, set the longitudinal offset such the first motor vehicle becomes equidistant to the second motor vehicle and third motor vehicle.

19. The automated driving apparatus of claim 11, wherein the control circuit is further operable to:
repeat the safety routine with respect to a third motor vehicle in an opposing adjacent lane to establish a longitudinal offset between the first motor vehicle and the third motor vehicle, while maintaining the longitudinal offset between the first motor vehicle and the second motor vehicle, wherein repeating the safety routine with respect to the third motor vehicle includes the control circuit performing the following:
determining, based on additional sensor data indicating positions and speeds of the first motor vehicle and the third motor vehicle, whether the first motor vehicle and the third motor vehicle are maintaining a same speed,
determining, based on the additional sensor data, whether the first motor vehicle can switch to the opposing adjacent lane without colliding with the third motor vehicle, and
responsive to determining that the first motor vehicle and the third motor vehicle are maintaining the same speed and that the first motor vehicle cannot switch to the opposing adjacent lane without colliding with the third motor vehicle, determining, based on the additional sensor data, a second longitudinal offset to establish between the first motor vehicle the third motor vehicle, and establishing the second longitudinal offset by automatically decreasing the speed of the first motor vehicle.

20. A computer-readable storage medium containing instructions that, when executed by one or more processors of a computer in a first motor vehicle, cause the one or more processors to:
monitoring a position of a second motor vehicle in an adjacent lane; and
perform an automated safety routine, including:
determining, based on sensor data indicating positions and speeds of the first motor vehicle and the second motor vehicle, whether the first motor vehicle and the second motor vehicle are maintaining a same speed,
determining, based on the sensor data, whether the first motor vehicle can switch to the adjacent lane without colliding with the second motor vehicle,
responsive to determining that the first motor vehicle and the second motor vehicle are maintaining the same speed and that the first motor vehicle cannot switch to the adjacent lane, without colliding with the second motor vehicle, determining, based on the sensor data, a longitudinal offset to establish between the first motor vehicle the second motor vehicle, and establishing the longitudinal offset by automatically decreasing the speed of the first motor vehicle, wherein the determining of the longitudinal offset to establish and the establishing of the longitudinal offset are performed only when it has been determined that the first motor vehicle and the second motor vehicle are maintaining the same speed and that the first motor vehicle cannot switch to the adjacent lane without colliding with the second motor vehicle, and
automatically adjusting the speed of the first motor vehicle to maintain at least the longitudinal offset until the processor determines that the first motor vehicle can switch to the adjacent lane, without colliding with the second motor vehicle.

* * * * *